| United States Patent Office | 3,513,243 |
|---|---|
|  | Patented May 19, 1970 |

3,513,243
NEW ANTIBIOTIC AND FUNGICIDAL AGENTS
Marvin Gold, Sacramento, and Henry J. Harcus, West Covina, Calif., assignors to Aerojet-General Corporation, Azusa, Calif., a corporation of Ohio
No Drawing. Original application Nov. 26, 1963, Ser. No. 326,286, now Patent No. 3,359,334, dated Dec. 19, 1967. Divided and this application May 20, 1965, Ser. No. 487,942
Int. Cl. A01n 9/24
U.S. Cl. 424—311                4 Claims

ABSTRACT OF THE DISCLOSURE

A process for controlling the growth of bacteria and fungus comprising treating the bacteria or fungus with an effective amount of a compound of the formula:

$$Cl-\underset{\underset{NO_2}{|}}{\overset{\overset{NO_2}{|}}{C}}-A_2-\overset{O}{\overset{||}{C}}-O-R_2$$

wherein $A_2$ is lower alkylene and $R_2$ is lower alkyl.

---

This is a division of application Ser. No. 326,286, filed Nov. 26, 1963 now Pat. No. 3,359,334.

This invention relates to certain novel halo dinitro compounds and their method of preparation.

It is an object of this invention to prepare certain novel organic compounds. It is another object of this invention to prepare new nitro compounds in a novel manner. Still another object of this invention is to provide novel antibiotic and antifungal compositions. These and other objects of this invention will be apparent from the detailed description which follows.

One type of the novel compounds of this invention has the following general formula:

(I) 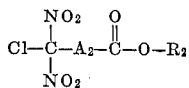

wherein R is a monovalent or divalent organic radical selected from the group consisting of $$-A_1-\overset{OH}{\overset{|}{C}H}-R_1$$

wherein $A_1$ is a lower alkylene radical, preferably of from 1 to 6 carbon atoms and $R_1$ is a lower alkyl or lower ω hydroxy alkyl radical, preferably of from 1 to 6 carbon atoms;

$$-A_2-\overset{O}{\overset{||}{C}}-O-R_2$$

wherein $A_2$ is lower alkylene, preferably of from 1 to 6 carbon atoms and $R_2$ is a lower alkyl radical of from 1 to 6 carbon atoms;

$$-A_3-CN$$

wherein $A_3$ is an alkylene radical preferably having from 1 to about 20 carbon atoms;

$$-A_4-\overset{O}{\overset{||}{C}}-\overset{R_4}{\overset{|}{N}}-R'_4$$

wherein $A_4$ is an alkylene radical, preferably from 1 to about 20 carbons; and $R_4$ and $R'_4$ are the same or different and are selected from the group consisting of hydrogen, hydrocarbyl, preferably alkyl or aryl having from 1 to about 12 carbons, ω-hydroxyalkyl preferably having from 1 to about 12 carbons;

$$A_5-\overset{O}{\overset{||}{C}}-O-A_5$$

wherein $A_5$ are alkylene, preferably of from 1 to 10 carbons;

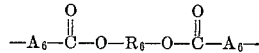

wherein $A_6$ and $R_6$ are alkylene, preferably of from 1 to 20 carbons;

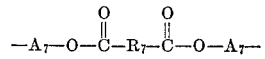

wherein the $A_7$ groups are alkylene, preferably of from 1 to 20 carbons; and $R_7$ is alkylene, preferably of from 1 to 20 carbons or vinylene (—CH=CH—); $n$ is an integer of from 1 to 2 and being equal to the valence of R; and X is chloro or bromo.

Illustrative compounds within the scope of Formula I include:

5-chloro-5,5-dinitro-2-hydroxy pentane,
6-bromo-6,6-dinitro-3-hydroxy hexane,
5-bromo-5,5-dinitro-1,2-pentanediol,
1-chloro-1,1-dinitro-2-cyanoethane,
1-bromo-1,1-dinitrovaleronitrile,
N-butyl-3-chloro-3,3-dinitropropionamide,
N-decyl-5-chloro-5,5-dinitropentanamide,
N-ω-hydroxyethyl-4-dinitrobutyramide,
N,N-diethyl-4-chloro-4,4-dinitrobutyramide,
2-chloro-2,2-dinitroethyl-6-chloro-6,6-dinitrohexanoate,
4-chloro-4,4-dinitrobutyl-4-chloro-4,4-dinitrobutyrate,
1,3-bis-(4-chloro-4,4-dinitrobutyryloxy)-propane,
1,10-bis-(4-chloro-4,4-dinitrobutyryloxy)-decane,
1,8-bis-(3-chloro-3,3-dinitropropionyloxy)-octane,
bis-(3-chloro-3,3-dinitropropyl) adipate,
bis-(3-chloro-3,3-dinitropropyl) maleate,
bis-(5-chloro-5,5-dinitropentyl) adipate,
bis-(5-chloro-5,5-dinitropentyl) maleate,
bis-(5-bromo-5,5-dinitropentyl) octanedioate,
bis-(5-bromo-5,5-dinitropentyl) maleate,
bis-(2-chloro-2,2-dinitroethyl) dodecanedioate,
bis-(2-chloro-2,2-dinitroethyl) maleate, In general, the compounds of Formula I are prepared by reacting chlorine or bromine with the corresponding salt of an organic gem-dinitro compound in accordance with the following general reaction:

(II) 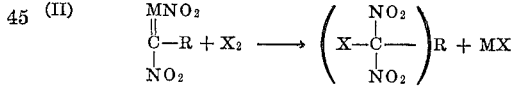

wherein A, R, X and $n$ are as defined above, and M is an alkali or alkaline earth metal such as sodium, potassium, lithium, or calcium.

Alternatively, certain of the compounds of Formula I may be prepared by procedures other than that set forth in Equation II. These alternative reactions are hereinafter set forth.

When R in Formula I is

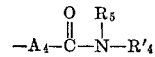

the halo dinitro compounds of this invention are prepared according to the following reaction equation:

(III)

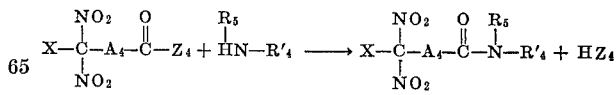

wherein X, $A_4$, $R_4$ and $R'_4$ are as defined above and $Z_4$ is chloro, bromo or hydroxy.

When R is

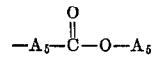

in Formula I, the preparation is in accordance with the following general reaction:

(IV)

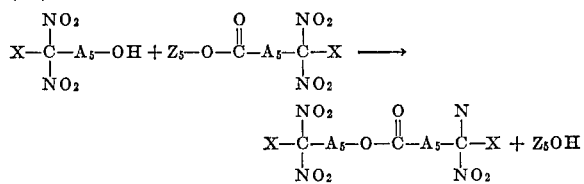

wherein X and $A_5$ are as defined above and $Z_5$ is lower alkyl, i.e., from 1 to 6 carbons.

Where R is

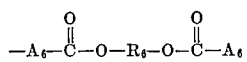

in the above Formula I, the reaction is as follows:

(V)

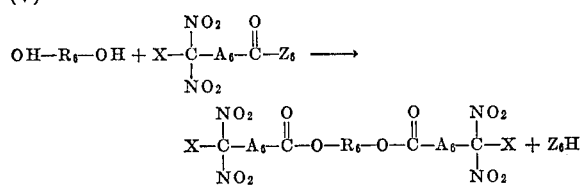

wherein X, $R_6$ and $A_6$ are as defined above and $Z_6$ is hydroxy, chloro or bromo.

When R is

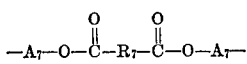

in Formula I, the reaction scheme is in accord with the following (VI)

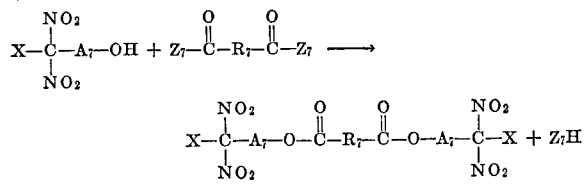

wherein X, $A_7$ and $R_7$ are as defined above and $Z_7$ is hydroxy, chloro or bromo.

The above reaction is conveniently carried out in any inert polar or non-polar solvent in which the reactants are soluble, i.e., water, methanol, ethanol, benzene, chloroform, etc. The proportions of the reactants employed in the reaction are not critical. Normally, stoichiometrically equivalent amounts are used since this results in the most economical utilization of the reactants. The reaction temperature should normally be sufficiently high so that the reactants will dissolve to a substantial degree in the reaction medium, but in any event, the reaction temperature should be below the composition temperature of the reactant. Normally, the reaction is conducted at a temperature between about −20° C. and about +120° C. The most preferred temperature is from about −10° C. to about +50° C. Pressure is not critical in this reaction. Therefore, while any pressure can be used, the reaction is normally run under atmospheric pressure. Agitation of the reactants such as by mechanical stirrer, while desirable in that it increases the reaction rate, is not necessary. The novel compounds of this invention may be isolated in conventional manner such as by extraction, distillation and/or filtration.

In the esterification reaction indicated above in Equations III to VI, it may be desirable in some cases in order to increase the reaction rate, to include in the reaction mixture a small, effective catalytic amount (0.1% to about 20% by weight based on total weight of reactants) of an acid esterification catalyst such as aluminum trichloride or polyphosphoric acid.

To more clearly illustrate our invention the following examples are presented. It is to be understood, however, that these examples are intended merely as an illustrative embodiment of the invention. In the examples, the percentages are by weight unless otherwise indicated.

EXAMPLE I

Preparation of bis-(2-chloro-2,2-dinitroethyl) maleate

To a solution of 83 g. 2,2-dinitropropane-1,3-diol in 150 ml. methanol at 0° C. was added, in portions, with shaking and hand-stirring, a cold solution of 32.5 g. potassium hydroxide in 150 ml. methanol. The light yellow potassium 2,2-dinitroethanol precipitated immediately. After standing in ice for half an hour, it was filtered and washed well with cold methanol. The wet filter-cake was suspended in 250 ml. water, and, with good stirring, chlorine introduced at 0° C. to 5° C. After 40 minutes, all the salt had disappeared and an oil had separated on the bottom of the flask. The mixture was light green; it was stirred for 15 minutes longer, the oil separated and the aqueous phase extracted three times with diethyl ether. The oil and ether solution were combined and dried over sodium sulfate. Removal of the solvent under vacuum left a very light green, slightly lachrymatory oil. Distillation at 0.4 to 0.5 mm. and 57.5 to 60° C. yielded 41 g. (0.24 mole) of 2-chloro-2,2-dinitroethanol. The 2-chloro-2,2-dinitroethanol is then reacted with 0.14 moles of maleic acid at 50 to 60° C. The bis-(2-chloro-2,2-dinitroethyl) maleate is obtained in good yields.

EXAMPLE II

Preparation of methyl 4-chloro-4,4-dinitrobutyrate

A 500 ml. round-bottom 3-neck flask was fitted with mechanical stirrer, thermometer, and dropping funnel. It was charged with 57.2 g. (0.258 mole) crude methyl 5-hydroxy-4,4-dinitropentanoate [Klager, Journal of Organic Chemistry 16, 162–163, (1951)] in 150 ml. methanol. At 0±5° C. solution of 6.8 g. sodium (0.30 mole) in 90 ml. methanol was added dropwise over 30 minutes. Stirring was continued for an additional 45 minutes. The yellow sodium salt of methyl 4,4-dinitrobutyrate salt was collected on a filter and washed with cold methanol. The wet salt was dissolved in 200 ml. water to a total volume of 250 ml. Then 82 ml. of the aqueous solution was charged to a 300 ml. round-bottom 3-neck flask fitted with stirrer, thermometer and gas inlet tube. At 5° C., chlorine was introduced with stirring. The temperature rose to 14° C. in 5 minutes, and a heavy yellow oil separated. Stirring was continued for 5 minutes after the temperature began to fall, while a slow stream of chlorine was introduced. The oil was separated, and the aqueous phase was extracted once with 100 ml., then with 40 ml. diethyl ether. The combined extracts were washed with 200 ml. water, and dried over sodium sulfate. Following removal of solvent by evaporation, the residue was submitted to vacuum distillation. Two fractions were collected:

(I) B.P. 60 to 66° at 0.15 mm., 1.0 g., $n_D^{24.8}$ 1.4614
(II) B.P. 66 to 69° at 0.15 mm., 7.1 g., $n_D^{24}$ 1.4615

Both were colorless liquids, and were combined.

*Elemental analysis.*—Calc'd for $C_5H_7N_2O_6Cl$ (percent): C, 26.58; H, 3.12; Cl, 15.64. Found (percent): C, 26.52; H, 3.38; Cl, 16.75.

EXAMPLE III 2-bromo-2,2-dinitroethyl 4-bromo-4,4-dinitrobutyrate

To 5.0 g. of 4% oleum (prepared by adding 120 g. of 30% fuming sulfuric acid to 100 g. of 96% sulfuric acid) was added 1.08 g. (0.0050 M) 2-bromo-2,2-dinitroethanol and 1.36 g. (0.0050 M) methyl 4-bromo-4,4-dinitrobutyrate. Both substances dissolved readily with a slight rise in temperature. The solution was very light yellow. After three days at room temperature, a few drops of the reaction mixture was stirred with ice; no solid was obtained. The reaction mixture was kept in an oil-bath at 50° C. for 22 hours. No solid product was isolated with ice. The temperature of the oil-bath was raised to 75° C., and maintained there for 20 hours. The reaction mixture was poured on ice with stirring; a nearly colorless, waxy solid separated. After thoroughly washing with water, the solid was left to dry on a porous plate. The crude ester weight 0.50 g. (22%), M.P. 66 to 72° C. Recrystallization from diisopropyl ether gave colorless product, M.P. 71.5 to 73° C.

*Elemental analysis.*—Calc'd for (percent): C, 15.87; H, 1.33; N, 12.34. Found (percent): C, 16.03; H, 1.32; N, 12.68.

When the above example was repeated using 2-chloro-2,2-dinitroethanol and methyl 4-chloro-4,4-dinitrobutyrate (prepared according to Example II) in lieu of 2-bromo-2,2-dinitroethanol and methyl 4-bromo-4,4-dinitrobutyrate, respectively, 2-chloro-2,2-dinitroethyl 4-chloro-4,4-dinitrobutyrate is obtained in good yields.

EXAMPLE IV

4-bromo-4,4-dinitrobutyranilide

Fifteen grams (0.058 M) 4-bromo-4,4-dinitrobutyric acid and thirty milliliters (0.42 M) thionyl chloride were refluxed for 45 minutes. The excess thionyl chloride was removed under vacuum, and the acid chloride recovered by distillation. A solution of 5.83 g. (0.0212 M) of the 4-bromo-4,4-dinitrobutyryl chloride in 10 ml. benzene was added gradually, over 45 minutes, to a solution of 3.72 g. (0.040 M) aniline in 7 ml. benzene at reflux. The precipitate which formed when the aniline solution was added tended to dissolve at the beginning, but complete solution was not attained. The mixture darkened as the reaction proceeded. The walls of the flask were rinsed with 5 to 10 ml. fresh benzene, and refluxing continued for thirty minutes. After cooling, an attempt to extract the aniline hydrochloride with water caused crystallization of the crude product in the separatory funnel. The anilide was dissolved with heating. The benzene solution, while still warm, was washed twice with water, boiled to remove water azeotropically, and, after cooling, treated with an equal volume of hexane. The crude product was filtered, washed with hexane, and air-dried. Wt. 4.8 g. (68%) M.P. 116 to 121°. On standing, an additional 0.3 g. (M.P. 90 to 126°) was collected from the mother liquor and wash. The crude, tan anilide (4.8 g.) was recrystallized from 70 ml. isopropanol and 30 ml. water, and decolorized twice with charcoal. The product was very light yellow; wt. 2.9 g. (corresponding to a 43% yield) M.P. 133 to 135°. A small sample, recrystallized again from aqueous isopropanol, was still light yellow and melted at 134 to 136°.

*Elemental analysis.*—Calc'd (percent): C, 36.16; H, 3.04; N, 12.65; Br, 24.05. Found (percent): C, 36.75; H, 3.23; N, 12.46; Br, 24.34.

When the above example is repeated employing ethylamine in lieu of aniline and 4-chloro-4,4-dinitrobutyric acid in place of 4-bromo-4,4-dinitrobutyric acid, N-ethyl-4-chloro-4,4-dinitrobutyramide is obtained.

EXAMPLE V

1,4-bis-(4-bromo-4,4-dinitrobutyryloxy)-butane 4-bromo-4,4-dinitrobutyryl chloride (5.22 g., 0.0203 M) was added to 1,4-butanediol (0.79 g., 0.0088 M). The reaction mixture became hot, and hydrogen chloride was evolved. The clear viscous light yellow mixture was placed in an oil-bath at 85 to 100° for 35 minutes; it was taken up in about 10 ml. benzene, and the product precipitated by the gradual addition of 30 ml. hexane. The colorless crystals were collected and washed with hexane; wt. 4.0 g. (76%), M.P. 80 to 82°. A small sample recrystallized twice (for elemental analysis) from benzene-hexane melted at 84 to 86°. The main portion (3.6) was recrystallized once from benzene-hexane (1:1); wt. 3.1 g. (86% recovery), M.P. 84 to 86°.

*Elemental analysis.*—Calc'd (percent): C, 25.37; H, 2.84; N, 9.86; Br, 28.14. Found (percent); C, 26.15; H, 3.00; N, 9.59; Br, 28.38.

When the above example is repeated using 4-chloro-4,4-dinitrobutyryl chloride in place of 4-bromo-4,4-dinitrobutyryl chloride and ethylene glycol in lieu of 1,4-butanediol, a good yield of bis-(4-chloro-4,4-dinitrobutyryloxy)-ethane is obtained.

EXAMPLE VI

Bis-(2-bromo-2,2-dinitroethyl) adipate 2-bromo-2,2-dinitroethanol (5.5 g., 0.0255 M), adipyl chloride (2.2 g., 0.012 M), and 2 drops of concentrated sulfuric acid were heated on the steam bath. Evolution of hydrogen chloride began almost immediately. After 45 minutes, the reaction mixture was poured into ice and water. The precipitated ester was broken up in a mortar and washed with water. The ester was then slurried on the funnel with one normal sodium carbonate solution, filtered, and washed well with water. Five and one half grams of crude product (M.P. 70 to 74°) were obtained after air drying. The ester was purified by dissolving in 25 ml. benzene, charcoaling, and adding 35 ml. hexane to the hot filtrate. Crystallization took place at −20°. The adipate was filtered, washed with cold hexane, and dried; weight 4.5 g. (70%), M.P. 72 to 74°. A small sample was again recrystallized from benzene-hexane for elemental analysis (M.P. 74 to 76°). Calc'd for: Br. 29.57%. Found: Br, 28.78%.

EXAMPLE VII

Bis-(2-chloro-2,2-dinitroethyl) adipate 2-chloro-2,2-dinitroethanol (11 g., 0.065 M), adipyl chloride (5.5 g., 0.030 M), and 4 drops of concentrated sulfuric acid were heated on the steam-bath for 30 minutes. Evolution of hydrogen chloride began even on mixing in the cold. The light-yellow solution was poured into ice and water. The light tan semi-solid which resulted after a few minutes' stirring could not be broken up into small particles in a mortar. It was washed successively with water, one normal sodium carbonate solution, and again with water, as well as possible and left to dry on a porous plate. The crude ester (10 g., M.P. 32 to 40°) was recrystallized from 35 ml. diisopropyl ether. The mixture was chilled at −20° and the crystals collected, washed with cold solvent, and dried; weight 6.0 g., M.P. 38 to 48°. A small sample was again recrystallized from diisopropyl ether (M.P. 49 to 51°) and submitted for elemental analysis: Calc'd: Cl, 15.73%. Found: Cl, 16.09%.

The main portion of the ester was recrystallized a second time from diisopropyl ether (20 ml.), and 3.8 g. (28%) of product, M.P. 47 to 52°, collected.

When the above example was repeated using seabacic acid in lieu of adipyl chloride, bis-(2-chloro-2,2-dinitroethyl) sebacicate was obtained.

EXAMPLE VIII

Preparation of 1-chloro-1,1-dinitrobutyronitrile

To one mole of 1,1-dinitrobutyronitrile (prepared by the addition of one mole of dinitromethane to one mole of acrylonitrile) is added 1 M potassium hydroxide at about 40 to 50° C. to form the potassium salt of 1,1-dinitrobutyronitrile. About 100 grams of the salt is then dissolved in about 2 liters of water. Then 100 ml. of this aqueous solution is charged to a 300 ml. round-bottom 3-neck flask fitted with stirrer, thermometer and gas inlet tube. At 0 to 10° C., chlorine gas is introduced with stirring. The addition of chlorine is continued for about 0.5 hour. The water is removed by evaporation under vacuum. The product 1-chloro-1,1-dinitro-3-cyano propane is obtained in good yields.

When the foregoing example is repeated utilizing 1,1-dinitro-3-methyl-butyronitrile in lieu of 1,1-butyronitrile, 1-chloro-1,1-dinitro-3-methyl-butyronitrile is obtained.

EXAMPLE IX

Preparation of 5-chloro-5,5-dinitro-1,2-pentanediol

To one mole of 5,5-dinitro-1,2-pentanediol (prepared by the addition of one mole of hydrogen peroxide to one mole of 5,5,5-trinitro-1,2-pentanediol) is added 1 M potassium hydroxide at about 40 to 50° C. to form the potassium salt of 5,5-dinitro-1,2-pentanediol. About 100 grams of the salt is then dissolved in about 2 liters of water. Then 100 ml. of this aqueous solution is charged to a 300 ml. round-bottom 3-neck flask fitted with stirrer, thermometer and gas inlet tube. At 0 to 10° C., chlorine gas is introduced with stirring. The addition of chlorine is continued for about 0.5 hour. The water is removed by evaporation under vacuum. The product 5-chloro-5,5-dinitro-1,2-pentanediol is obtained in good yield.

When the foregoing example is repeated utilizing 5,5-dinitro-2-pentanol in lieu of 5,5-dinitro-1,2-pentanediol, 5-chloro-5,5-dinitro-2-pentanol is obtained.

In addition to the novel compounds within the scope of Formula I are still another class of novel polynitro compounds. The compounds have the following general formula:

(VII)
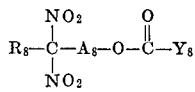

wherein $A_8$ is a lower alkylene group preferably having from 1 to about 6 carbon atoms such as methylene, ethylene, butylene and hexamethylene; $R_8$ is a lower alkyl group preferably having from 1 to about 6 carbon atoms such as methyl, ethyl, butyl and hexyl; and $Y_8$ is hydrogen or alkoxy, preferably lower alkoxy of from 1 to 8 carbons such as ethoxy (—$OC_2H_5$), methoxy (—$OCH_3$), etc.

Typical of the compounds within the scope of Formula VII are: 2,2-dinitrobutyl formate, 3,3-dinitrooctyl formate, 5,5-dinitrohexyl formate, ethyl-2,2-dinitropropyl carbonate, hexyl-4,4-dinitrodecyl carbonate, isopropyl-2,2-dinitropropyl carbonate and propyl 2,2-dinitropropyl carbonate.

The novel esters of the above formula are prepared in accordance with the following general reaction.

(VIII)
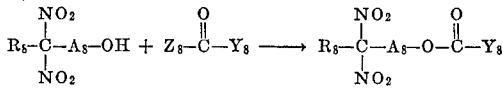

wherein $A_8$, $R_8$ and $Y_8$ are as defined above; and $Z_8$ is hydroxy or halogen, preferably chlorine or bromine.

The above reaction is conveniently, although not necessarily carried out in any inert solvent in which the reactants are soluble, i.e., benzene, toluene or hexane. The proportions of the reactants employed in the reaction are not critical. Normally, stoichiometrically equivalent amounts are used since this results in the most economical utilization of the reactants. Thus, usually one mole of alcohol is used per mole of acid or halo carbonate. The reaction temperature should normally be sufficiently high so that the reactants will dissolve to a substantial degree in the reaction medium, but in any event, the reaction temperature should be below the composition temperature of the reactant. Normally, the reaction is conducted at a temperature between about 0° C. and about 100° C. The most preferred temperature is from about +40° C. to about 75° C. Pressure is not critical in this reaction. Therefore, while any pressure can be used, the reaction is normally run under atmospheric pressure.

The above reaction is preferably conducted in the presence of an effective catalytic amount of an acid esterification catalyst such as aluminum chloride or boron trifluoride.

EXAMPLE X

2,2-dinitropropyl formate

To a solution of 16.0 g. (0.10 M, 95% pure) 2,2-dinitropropanol in 22 ml. formic acid (98 to 100%) was added a spatula-tip of anhydrous aluminum chloride. After refluxing for 23 hours, the mixture was poured into ice-water and the crude ester separated with the aid of 30 ml. methylene chloride. The organic phase was extracted first with 50 ml., and then with 25 ml. of cold one normal sodium hydroxide solution, washed twice with water, and dried overnight. Removal of the solvent in vacuo left 2.0 g. (11% of theory) of very light green liquid, $n_D^{25}$ 1.4486. Distillation at 72.5 to 73.5° C./0.6 mm. gave a colorless distillate, $n_D^{25}$ 1.4487.

*Elemental analysis.*—Calc'd for $C_4H_6N_2O_6$ (percent): C, 26.97; H, 3.40; N, 15.73. Found (percent): C, 27.33; H, 3.37; N, 15.60.

When the foregoing example is repeated substituting 3,3-dinitrobutanol for 2,2-dinitropropanol, a good yield of 3,3-dinitrobutyl formate is obtained.

EXAMPLE XI

Methyl 2,2-dinitropropyl carbonate

To 50 ml. of a benzene solution of 2,2-dinitropropanol (containing about 0.08 M of the alcohol) was added 9.0 ml. (0.12 M) methyl chloroformate and a spatula-tip of anhydrous aluminum chloride. This mixture was refluxed 17 hours, and the benzene and unreacted chloroformate removed in vacuo. A light brown residue, consisting of much liquid and a little solid matter, remained. The liquid was dissolved in chloroform, clarified with charcoal, and the solvent removed. Fourteen grams of light brown liquid, $n_D^{25}$ 1.4481, were obtained. Vacuum distillation yielded the following:

| | Degrees | Millimeters | Grams | $n_D^{25}$ | Grams | Percent |
|---|---|---|---|---|---|---|
| I | B.P.-73 | 0.6 | 1.4 | 1.4485 | | |
| II | 73-76 | 0.4-0.5 | 7.8 | 1.4486 | 9.0 | 54 |
| III | >76 | 0.4-0.5 | 1.2 | 1.4487 | | |

The residue (0.7 g.) was slightly viscous and light brown in color. The crude carbonate (Fractions I, II and III combined) was dissolved in 25 ml. methylene chloride. It was extracted twice with cold solutions of 20 and 10 ml., respectively, of one normal sodium hydroxide, washed twice with water, and dried over sodium sulfate. The carbonate after removal of the solvent weight 4.8 g., $n_D^{25}$ 1.4422. On vacuum distillation, the following fractions were collected:

(I) 88 to 93°   0.6 mm.   1.6 g.   $n_D^{25}$ 1.4422
(II) 93 to 94°   0.6 mm.   2.4 g.   $n_D^{25}$ 1.4425
(III) >94°   0.6 mm.   0.1 g.

Fraction II showed no presence of hydroxyl in the infrared spectrum.

*Elemental analysis* (II).—Calc'd for $C_5H_8N_2O_7$ (percent): C, 28.85; H, 3.87; N, 13.46. Found (percent): C, 29.49; H, 4.37; N, 13.92.

When the above example is repeated using 3,3-dinitro-1-pentanol in lieu of 2,2-dinitropropanol, and ethyl bromoformate in place of methyl chloroformate, a substantial quantity of essentially pure ethyl-3,3-dinitropropyl carbonate is obtained.

The compounds of this invention, which contain a plurality of nitro groups, are inherently useful as high explosives. These compounds can also be used in any conventional explosive missile, projectile, rocket or the like, as the main explosive charge. An example of such a missile is described in U.S. Pat. 2,470,162, issued May 17, 1949. One way of using such high explosives in a device such as that disclosed in U.S. Pat. 2,470,162 is to absorb the liquid explosive in an absorbent material such as cellulose, wood pulp, or sawdust. The resultant dynamite-type explosive can then be packed into the warhead of the missile. A charge thus prepared is sufficiently insensitive to withstand the shock entailed in the ejection of a shell from a gun barrel or a rocket launching tube under the pressure developed from ignition of a propellant charge, and can be caused to explode on operation of an impact or time-fuse mechanism firing a detonating explosive such as lead azide or mercury fulminate.

Certain of the novel compounds of this invention are also useful as fungicides, in the prevention of bacterial growth, and as plasticizers for solid rocket propellant formulations.

This example describes a particular method of preparing a novel propellant composition from the following ingredients employing methyl 2,2-dinitropropyl carbonate as a plasticizer:

EXAMPLE XII

| Ingredient: | Weight percent |
|---|---|
| Ammonium perchlorate | 66.00 |
| Aluminum | 16.00 |
| Copper chromite | 0.50 |
| Phenyl betanapthylamine | 0.20 |
| Ferric acetylacetonate | 0.08 |
| Glycerol monoricinoleate | 1.00 |
| Polypropylene glycol (M.W.=2000) | 10.84 |
| Dioctyl azelate | 3.00 |
| Methyl 2,2-dinitropropyl carbonate | 0.20 |
| Lecithin | 0.20 |
| Tolylene diisocyanate | 1.98 |
| | 100.00 |

The aluminum powder is stirred into about ⅓ of the required volume of polypropylene glycol and glycerol monoricinoleate. The mixture is prepared in a stainless steel container, using a copper-beryllium spatula. Mixing is continued for about ten minutes.

The aluminum slurry is added to a conventional mixer equipped with facilities for heating, cooling and vacuumizing the propellant mix. The walls of the aluminum slurry container are scraped thoroughly. The container is rinsed with ½ of the required volume of dioctyl azelate and the rinses are added to the mixer. The remaining polypropylene glycol is added to the mixer. The methyl 2,2-dinitropropyl carbonate is mixed with the remaining dioctyl azelate until homogeneous and the solution is then added to the mixer.

With the mixer off, the ferric acetylacetonate, phenyl betanaphthylamine, and lecithin are added through a 40-mesh screen. The copper chromite is added to the mixer.

The mixer is covered and mixed by remote control for 15 minutes under 26 to 28 inches of vacuum, after which it is stopped and the vacuum released with dry nitrogen. The cover is removed from the mixer and the oxidizer is added by remote control with the mixer blades in motion.

After all of the oxidizer has been added, the mixer is stopped and scraped down. The propellant mass is mixed for 15 minutes at 70° F. under 26 inches vacuum by remote control. The mixer is stopped and the vacuum released with dry nitrogen. The tolylene diisocyanate is added, after which the mass is mixed for ten minutes at 70° F. and 26 inches of vacuum by remote control. The vacuum is then released with dry nitrogen and the mixture is cast.

Propellants prepared in the foregoing manner have a specific impulse in the range from 225 to about 250 seconds.

The compounds of Formula I are especially useful as antibiotics and as anti-fungals. In this respect, the compounds of Formula I wherein X is chloro are far superior in effectiveness to the corresponding bromo compounds. Most preferred of the compounds within the scope of Formula I are those of the formula (IX) 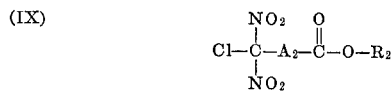

wherein $A_2$ is lower alkylene and $R_2$ is lower alkyl.

The compounds of Formula VII are highly effective as anti-fungals. Also useful as anti-fungals in accordance with the procedures of this invention are the ether compounds having the general formula:

(X) 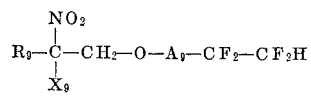

wherein $A_9$ is a lower alkylene group preferably having from 1 to about 6 carbons, $R_9$ is a lower alkyl radical preferably having from 1 to about 6 carbons and $X_9$ is hydrogen or nitro. Typical compounds within the scope of Formula X include 2-nitropropyl 2,2,3,3-tetrafluoro propyl ether and 2,2-dinitropropyl 2,2,3,3-tetrafluoro propyl ether. The compounds of Formula X and their method of preparation are disclosed in greater detail in assignee's copending U.S. application Ser. No. 326,284, filed Nov. 26, 1963, now Pat. No. 3,399,240.

Other classes of compounds which can be used as anti-fungals according to our invention are:

(XI) 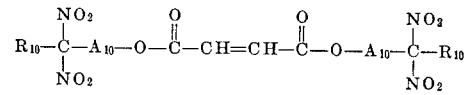

wherein both $A_{10}$ groups are lower alkylene from 1 to about 6 carbons, and the $R_{10}$ groups are alkyl of from 2 to 6 carbons;

(XII) 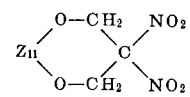

wherein $Z_{11}$ is

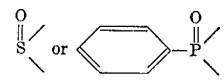

(XIII) 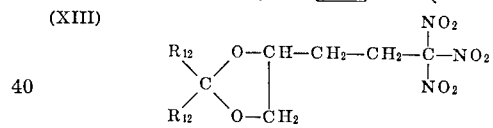

wherein both $R_{12}$ groups are lower alkyl, preferably of from 1 to 6 carbons; and (XIV) 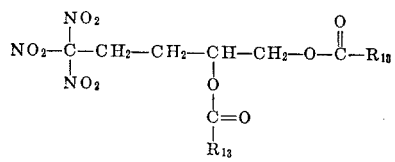

wherein $R_{13}$ in each instance is lower alkyl of from 1 to about 6 carbons.

The compounds of Formula XI, and their method of preparation are disclosed in assignee's copending U.S. patent application Ser. No. 326,287, filed Nov. 26, 1963.

The compounds of Formula XII, and their method of preparation are disclosed in assignee's copending U.S. patent application Ser. No. 326,285, filed Nov. 26, 1963.

The compounds of Formulae XIII and XIV, and their method of preparation are disclosed in assignee's copending U.S. patent application Ser. No. 326,288, filed Nov. 26, 1963, now Pat. No. 3,306,929.

In the anti-bacterial test a compound within the scope of Formula I was compared in vitro to penicillin against *B. subtilis* (gram positive bacteria) and to chloromycetin against *E. coli* (gram negative bacteria). The compound tested was the compound of Example II, methyl 4-chloro-4,4-dinitrobutyrate.

EXAMPLE XIII

Two glass plates were uniformly and completely coated with a sterile aqueous solution of gum agar pH 5.7. The agar film was inoculated with the *B. subtilis*. Upon each plate was then placed a small 0.10 ml. glass cylinder, one filled with a standard solution of penicillin containing 0.001 mg. per milliliter, on the other plate an aqueous solution of the methyl-4-chloro-4,4-dinitrobutyrate containing one mg. per milliliter. The plates were then incubated by maintaining them at a temperature of about 37° C. After about 15 hours a clear zone of growth inhibition around each of the cylinders could be observed. The area of the zone of growth inhibition around the cylinder containing methyl-4-chloro-4,4-dinitrobutyrate was somewhat greater than the area of the zone of growth inhibition around the cylinder containing the standard penicillin solution.

EXAMPLE XIV

Two glass plates were uniformly and completely coated with a sterile aqueous solution of gum agar. The agar film wase inoculated with the *E. coli*. Upon each plate was then placed a small glass cylinder, one filled with a standard solution of penicillin containing one unit per milliliter, on the other plate an aqueous solution of the methyl-4-chloro-4,4-dinitrobutyrate. The plates were then incubated at a temperature of about 37° C. After about 15 hours a clear zone of growth inhibition around each of the cylinders could be observed. The area of the zone of growth inhibition around the cylinder containing methyl-4-chloro-4,4-dinitrobutyrate was somewhat greater than the area of the zone of growth inhibition around the cylinder containing the standard penicillin solution.

Anti-fungal tests were conducted using compounds within the scope of Formulae IX to XIV. In each of these tests the test organism was trichophyton mentagrophytes.

EXAMPLE XV

The drug was placed on the surface of an inoculated agar plate prepared in accordance with Example XIV, and the zone of inhibition caused by the test compound (0.1 mg./ml.) compared with that produced by a solution of undecylenic acid, (0.1 mg./ml.), a standard commerical fungicide. The results of the testing are evaluated in accordance with the following scale.

SCALE

0—Inactive
1—Poor (less active than undecylenic acid)
2—Good (approximately equal to undecylenic acid)
3—Excellent (at least 2.5 times more active than undecylenic acid)

The results obtained in accordance with the above-described anti-fungal tests are set forth in the following table.

TABLE I

| Compound: | Rating |
|---|---|
| Methyl - 4-chloro-4,4-dinitrobutyrate (compound of Formula I) | 3 |
| 2,2-dinitropropyl formate (compound of Formula VII) | 3 |
| Bis-(2,2-dinitrobutyl) maleate (compound of Formula XI) | 3 |
| Methyl 2,2-dinitropropyl carbonate (compound of Formula VII) | 3 |
| Cyclic sulfite of 2,2-dinitro-1,3-propanediol (compound of Formula XII) | 3 |
| Cyclic phenyl phosphite of 2,2-dinitro-1,3-propanediol (compound of Formula XIII) | 3 |
| 2,2-dinitropropyl-2,2,3,3-tetrafluoro propyl ether (compound of Formula IX) | 3 |
| 5,5,5-trinitro-1,2-pentanediol diacetate (compound of Formula XIV) | 3 |
| 2,2-dimethyl-4(3′,3′,3′-trinitropropyl 1,3-dioxolane (compound of Formula XIII) | 3 |
| Bis-(2,2-dinitropropyl) maleate | 2 |
| Bis-(2-bromo-2,2-dinitroethyl) adipate | 2 |

Application of the antibacterial and antifungal compounds of this invention for the various purposes disclosed may be made from solutions in suitable solvent carriers, such as alcohol, benzene, and petroleum naphtha, or from dispersions in aqueous or other media, or in the form of a dust. They may be used in combination with supplementary agents, such as talc, bentonite, tricalcium phosphate, various clays, spreading agents, stickers and other adjuvants commonly used in bacteria and fungus control compositions. They may also be used in combination with other bacteria and fungus control agents, such as sulfur fungicides or organic fungicides and various other agents commonly used in fungicidal and insecticidal applications. When the bactericides and fungicides of this invention are used in conjunction with adjuvants, the active ingredient is employed in a bactericidally or fungicidally effective amount, normally from about 0.01% to 90% by weight of the total composition. Caution should be used in using these products since many of them are irritant to the skin.

We claim:

1. A process for controlling growth of bacteria, said process comprising treating the bacteria with a compound of the formula:

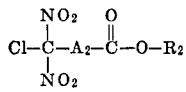

wherein $A_2$ is lower alkylene and $R_2$ is lower alkyl, in an amount effective to inhibit bacteria growth.

2. A process for controlling growth of bacteria, said process comprising treating the bacteria with methyl-4-chloro-4,4-dinitrobutyrate, in an amount effective to inhibit bacteria growth.

3. A process for controlling the growth of fungus, said process comprising treating the fungus with a compound of the formula:

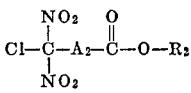

wherein $A_2$ is lower alkylene and $R_2$ is lower alkyl, in an amount effective to inhibit fungus growth.

4. A process for controlling the growth of fungus, said process comprising treating the fungus with methyl-4-chloro-4,4-dinitrobutyrate, in an amount effective to inhibit fungus growth.

References Cited

UNITED STATES PATENTS

| 2,967,829 | 1/1961 | Bennett. |
| 3,274,236 | 9/1966 | Schmerling. |
| 3,306,929 | 2/1967 | Linden. |
| 3,359,334 | 12/1967 | Gold et al. |

OTHER REFERENCES

Chemical Abstracts 53: 11046(f) (1959).

ALBERT T. MEYERS, Primary Examiner

J. D. GOLDBERG, Assistant Examiner

PO-1050
(5/69)

UNITED STATES PATENT OFFICE
CERTIFICATE OF CORRECTION

Patent No. 3,513,243      Dated May 19, 1970

Inventor(s) Marvin Gold and Henry J. Harcus (uncorrected)

It is certified that error appears in the above-identified patent and that said Letters Patent are hereby corrected as shown below:

The names of the two inventors are corrected to read:

Marvin H. Gold and Henry J. Marcus

SIGNED AND
SEALED
DEC 22 1970

(SEAL)
Attest:

Edward M. Fletcher, Jr.
Attesting Officer

WILLIAM E. SCHUYLER, JR.
Commissioner of Patents